United States Patent
Mark et al.

(10) Patent No.: US 11,691,742 B1
(45) Date of Patent: Jul. 4, 2023

(54) CONTAINMENT ZONE FOR AN ELECTRIC MACHINE IN A HYBRID POWERPLANT FOR AN AIRCRAFT

(71) Applicant: Pratt & Whitney Canada Corp., Longueuil (CA)

(72) Inventors: Michael Mark, Montreal (CA); Ion Dinu, Candiac (CA)

(73) Assignee: Pratt & Whitney Canada Corp, Longueuil (CA)

( * ) Notice: Subject to any disclaimer, the term of this patent is extended or adjusted under 35 U.S.C. 154(b) by 0 days.

(21) Appl. No.: 17/665,200

(22) Filed: Feb. 4, 2022

(51) Int. Cl.
| | |
|---|---|
| *B64D 27/02* | (2006.01) |
| *B64D 27/24* | (2006.01) |
| *B64D 35/08* | (2006.01) |
| *F02C 7/36* | (2006.01) |
| *H02K 7/00* | (2006.01) |
| *F02C 6/00* | (2006.01) |

(52) U.S. Cl.
CPC ............. *B64D 27/02* (2013.01); *B64D 27/24* (2013.01); *B64D 35/08* (2013.01); *F02C 6/00* (2013.01); *F02C 7/36* (2013.01); *H02K 7/003* (2013.01); *B64D 2027/026* (2013.01); *F05D 2220/76* (2013.01)

(58) Field of Classification Search
CPC ........ B64D 27/02; B64D 27/24; B64D 35/08; B64D 2027/026; F02C 6/00; F02C 7/36; H02K 7/003; F05D 2220/76
See application file for complete search history.

(56) References Cited

U.S. PATENT DOCUMENTS

| | | | |
|---|---|---|---|
| 10,752,369 B2 | 8/2020 | Takami | |
| 2020/0130534 A1* | 4/2020 | Julien | ........................ F01P 3/12 |
| 2020/0271061 A1* | 8/2020 | Kopeschka | ............. F02D 45/00 |
| 2020/0347743 A1* | 11/2020 | Long | ..................... B64D 27/02 |
| 2021/0031934 A1 | 2/2021 | Becker | |
| 2021/0163142 A1 | 6/2021 | Lacko | |

* cited by examiner

*Primary Examiner* — Hoang M Nguyen
(74) *Attorney, Agent, or Firm* — Getz Balich LLC

(57) ABSTRACT

A hybrid powerplant is provided for an aircraft. This aircraft hybrid powerplant includes a housing, an electric machine, a heat engine and a geartrain. The housing includes a containment zone located within the housing. The electric machine is arranged within the containment zone. The heat engine is arranged partially or completely within the housing and outside of the containment zone. The geartrain is arranged partially or completely within the housing and partially or completely outside of the containment zone. The electric machine, the heat engine and the geartrain are operatively interconnected.

20 Claims, 10 Drawing Sheets

CONTAINMENT ZONE FOR AN ELECTRIC MACHINE IN A HYBRID POWERPLANT FOR AN AIRCRAFT

TECHNICAL FIELD

This disclosure relates generally to an aircraft and, more particularly, to a hybrid powerplant for the aircraft.

BACKGROUND INFORMATION

A hybrid powerplant for an aircraft may include an electric machine and a thermal engine such as a gas turbine engine or a piston engine. While various hybrid powerplants are known in the art, there is still room in the art for improvement.

SUMMARY

According to an aspect of the present disclosure, a hybrid powerplant is provided for an aircraft. This aircraft hybrid powerplant includes a housing, an electric machine, a heat engine and a geartrain. The housing includes a containment zone located within the housing. The electric machine is arranged within the containment zone. The heat engine is arranged at least partially within the housing and outside of the containment zone. The geartrain is arranged at least partially within the housing and at least partially outside of the containment zone. The electric machine, the heat engine and the geartrain are operatively interconnected.

According to another aspect of the present disclosure, another hybrid powerplant is provided for an aircraft. This aircraft hybrid powerplant includes a housing, an electric machine and a heat engine. The housing includes a containment zone and a containment wall. The containment zone is located within the housing and is at least partially formed by the containment wall. The containment wall is configured to maintain the containment zone when subject to an electrical arc of at least two-hundred and twenty volts. The electric machine is arranged within the housing to a first side of the containment wall. The heat engine is arranged within the housing to a second side of the containment zone.

According to still another aspect of the present disclosure, another hybrid powerplant is provided for an aircraft. This aircraft hybrid powerplant includes a housing, an electric machine and a heat engine. The housing includes a first containment zone and a second containment zone. The first containment zone is located with the housing. The second containment zone is located within the housing and is fluidly discrete from the first containment zone. The electric motor is arranged within the first containment zone. The heat engine is arranged within the second containment zone. The heat engine is configured as or otherwise includes a fuel burning engine.

A shaft may be included that is motively coupled to the heat engine and the electric machine through the geartrain.

The geartrain may be completely outside of the containment zone.

The heat engine may be completely within the housing. The geartrain may be completely within the housing.

A geartrain may be included and arranged within the housing to the second side of the containment zone. The geartrain may be mechanically coupled to the electric machine and the heat engine.

The housing may also include a firewall at least partially forming the containment zone. The firewall may be configured to maintain the containment zone when subjected to a high voltage electrical arc of at least two-hundred and twenty volts.

The housing may also include a firewall at least partially forming the containment zone. The firewall may be configured to maintain the containment zone when subjected to a high voltage electrical arc of at least five hundred volts.

The housing may also include a firewall at least partially forming the containment zone. The firewall may be configured to maintain the containment zone when subjected to a fire.

The housing may also include a firewall at least partially forming the containment zone. A mechanical coupler may project through the firewall and may motively couple the electric machine to the geartrain.

The housing may also include a firewall at least partially forming the containment zone. The firewall may form a barrier between the electric machine and the heat engine.

The hybrid powerplant may also include an electric apparatus. This electric apparatus may be within the housing and/or may be discrete from the heat engine. The housing may include a firewall that at least partially forms the containment zone. The firewall may form a barrier between the electric machine and the electric apparatus.

The housing may also include a firewall at least partially forming the containment zone. The firewall may form a barrier between the electric machine and an open air environment outside of the housing.

An electric power source and an electrical lead may be included. The housing may also include a firewall at least partially forming the containment zone. The electrical lead may project through the firewall and may electrically couple the electric power source to the electric machine.

An electric power source may be included and arranged within the containment zone and electrically coupled to the electric machine.

A controller may be included and arranged within the containment zone and configured to control operation of the electric machine. Alternatively, the controller may be arranged outside of the containment zone and/or the housing.

A nacelle, an electric system, and a fuel system for the heat engine may be included. The electric system may include the electric machine. An entirety of the electric system within the nacelle may be arranged within the containment zone. An entirety of the fuel system within the nacelle may be arranged outside of the containment zone.

An aircraft component, an electric system, and a fuel system for the heat engine may be included. The aircraft component may be configured as or otherwise include a nacelle or a fuselage. The electric system may include the electric machine. An entirety of the electric system within the aircraft component may be arranged within the containment zone. An entirety of the fuel system within the aircraft component may be arranged outside of the containment zone.

The containment zone may be a pressurized zone within the housing.

The housing may also include a second containment zone located within the housing. The second containment zone may be fluidly decoupled from the containment zone. The heat engine may be arranged within the second containment zone.

The geartrain may be coupled to the electric machine and the heat engine in parallel.

The geartrain may be coupled in series between the electric machine and the heat engine.

The electric machine may be configurable as an electric motor during a motor mode of operation. The electric machine may also or alternatively be configurable as an electric generator during a generator mode of operation.

The heat engine may be configured as or otherwise include a gas turbine engine. The heat engine may alternatively be configured as or otherwise include a reciprocating piston engine, a rotary engine or any other type of internal combustion (IC) engine.

A propulsor rotor may be included and coupled to and rotatably driven by the shaft.

The hybrid powerplant may also include a generator powered by the heat engine. The generator may be electrically coupled to the electric machine through an electrical distribution network.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
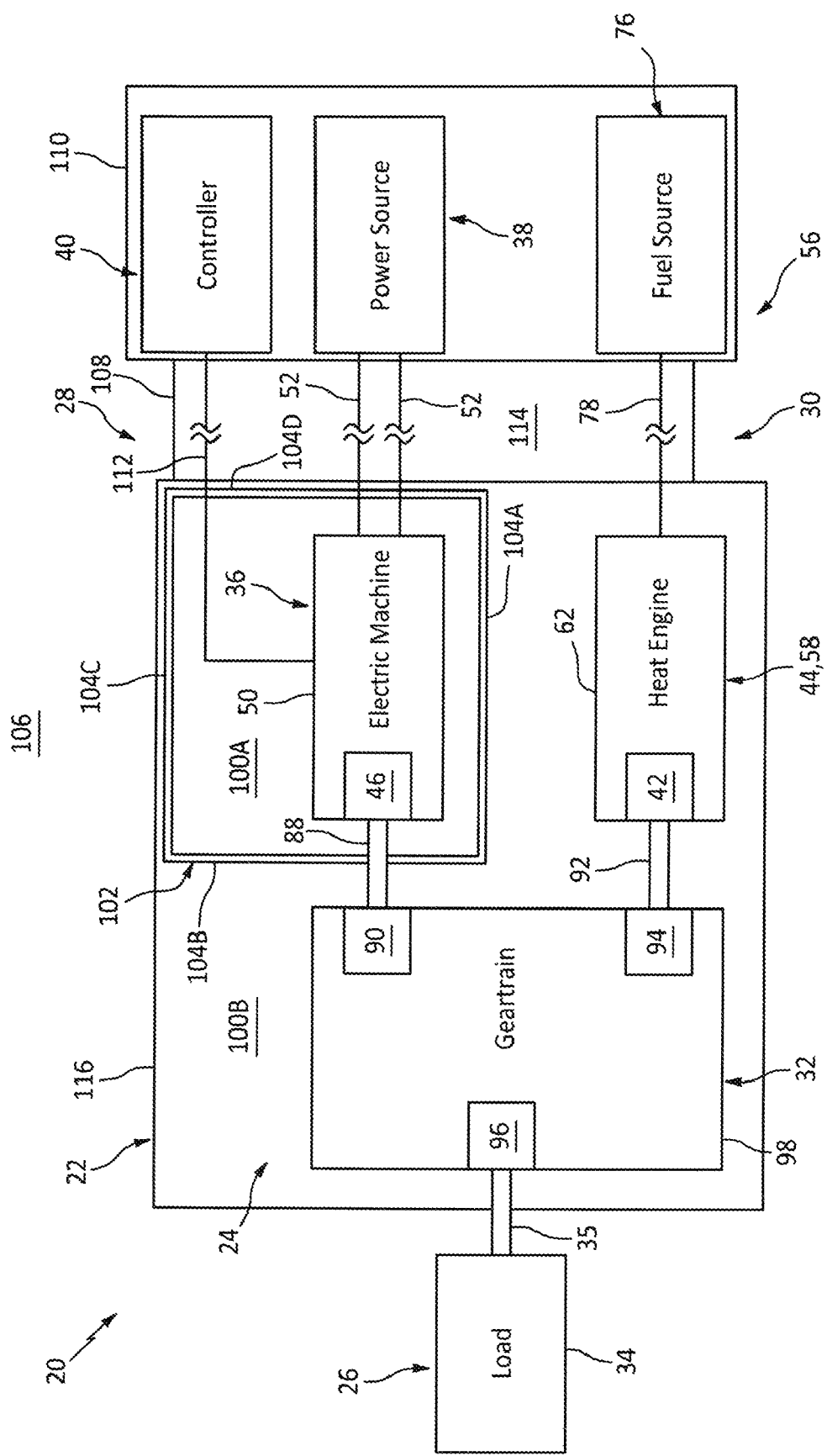
FIG. 1 is a schematic illustration of a parallel hybrid powerplant for an aircraft.

FIG. 1 is a schematic illustration of a hybrid powerplant 20 for an aircraft. This hybrid powerplant 20 includes a powerplant housing 22 and a powerplant powertrain 24 at least partially contained within the powerplant housing 22. The powerplant powertrain 24 includes a mechanical load 26, an (e.g., a high voltage) electric system 28, a heat engine system 30 and a geartrain 32; e.g., a gearbox, a transmission, etc.

The mechanical load 26 may be configured as or otherwise include a rotor 34 of the hybrid powerplant 20 mechanically driven by an output shaft 35. The mechanical load 26, for example, may be configured as a bladed propulsor rotor for an aircraft propulsion system. Examples of the propulsor rotor include, but are not limited to, a propeller for a propeller engine (e.g., a hybrid turboprop engine), a fan for a ducted fan engine (e.g., a hybrid turbofan engine), and a rotor (e.g., a main rotor) for a helicopter engine (e.g., a hybrid turboshaft engine). The mechanical load 26 may alternatively be configured a generator rotor in an electrical power generator where, for example, the hybrid powerplant 20 is configured as a hybrid auxiliary power unit (APU). The present disclosure, however, is not limited to the foregoing exemplary mechanical loads nor the foregoing exemplary hybrid powerplant configurations.

The electric system 28 includes an electric machine 36, a power source 38 and a controller 40. The electric machine 36 may be configurable as an electric motor and/or an electric generator. For example, during a motor mode of operation, the electric machine 36 may operate as the electric motor to convert electricity received from the power source 38 into mechanical power; e.g., torque. This mechanical power may be utilized for various purposes within the hybrid powerplant 20 such as, for example, rotating the rotor 34 and/or rotating a rotating assembly 42 within a heat engine 44 during heat engine startup. During a generator mode of operation, the electric machine 36 may operate as the electric generator to convert mechanical power received from, for example, the heat engine rotating assembly 42 and/or the rotor 34 into electricity. This electricity may be utilized for various purposes within the hybrid powerplant 20 such as, for example, electrically powering one or more electric components of the hybrid powerplant 20 and/or charging the power source 38. The electricity may also or alternatively be utilized for various purposes outside of the hybrid powerplant 20 such as, for example, electrically powering one or more electric components in an aircraft.

Figure 2:
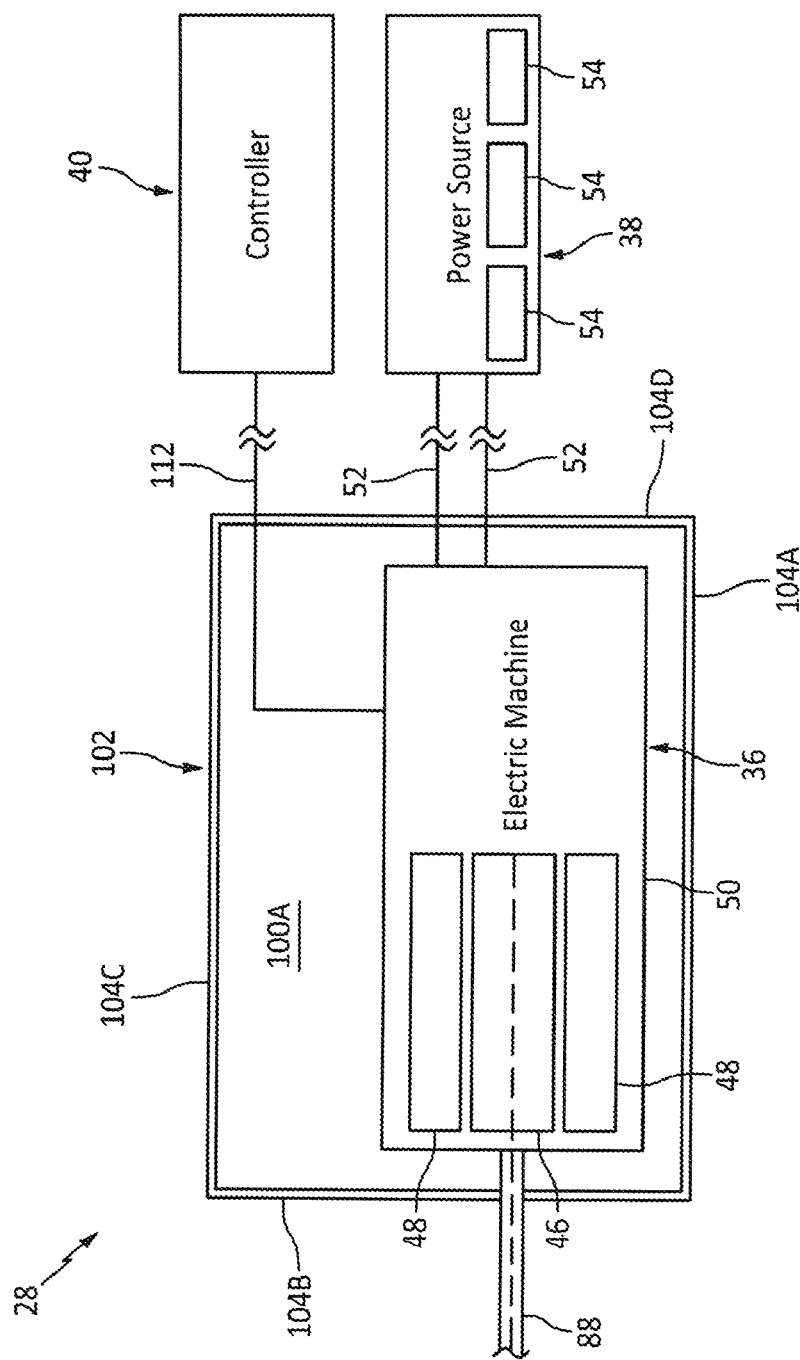
FIG. 2 is a schematic illustration of an electric system with an electric machine for the hybrid powerplant.

The electric machine 36 of FIG. 2 includes an electric machine rotor 46 and an (e.g., annular) electric machine stator 48, where the machine stator 48 may be radially outboard of and circumscribe the machine rotor 46. The electric machine 36 also includes an electric machine case 50 that at least partially or completely houses the machine rotor 46 and the machine stator 48.

The electric machine 36 is configured in signal communication (e.g., hardwired and/or wirelessly coupled) with the controller 40; e.g., through a signal line 112. The electric machine 36 is electrically coupled with the power source 38 through one or more electrical leads 52; e.g., high voltage lines.

The power source 38 is configured to store electricity. The power source 38 is also configured to provide the stored electricity to the electric machine 36 and/or receive electricity from the electric machine 36; e.g., during recharging. The power source 38, for example, may be configured as or otherwise include one or more batteries 54; e.g., a battery bank.

The heat engine system 30 of FIG. 1 includes the heat engine 44 and a fuel system 56 for providing fuel to the heat engine 44. The heat engine 44 is configured to convert chemical energy stored within the fuel into mechanical power. The heat engine 44 of FIG. 3, for example, is configured as a gas turbine engine 58.

Figure 3:
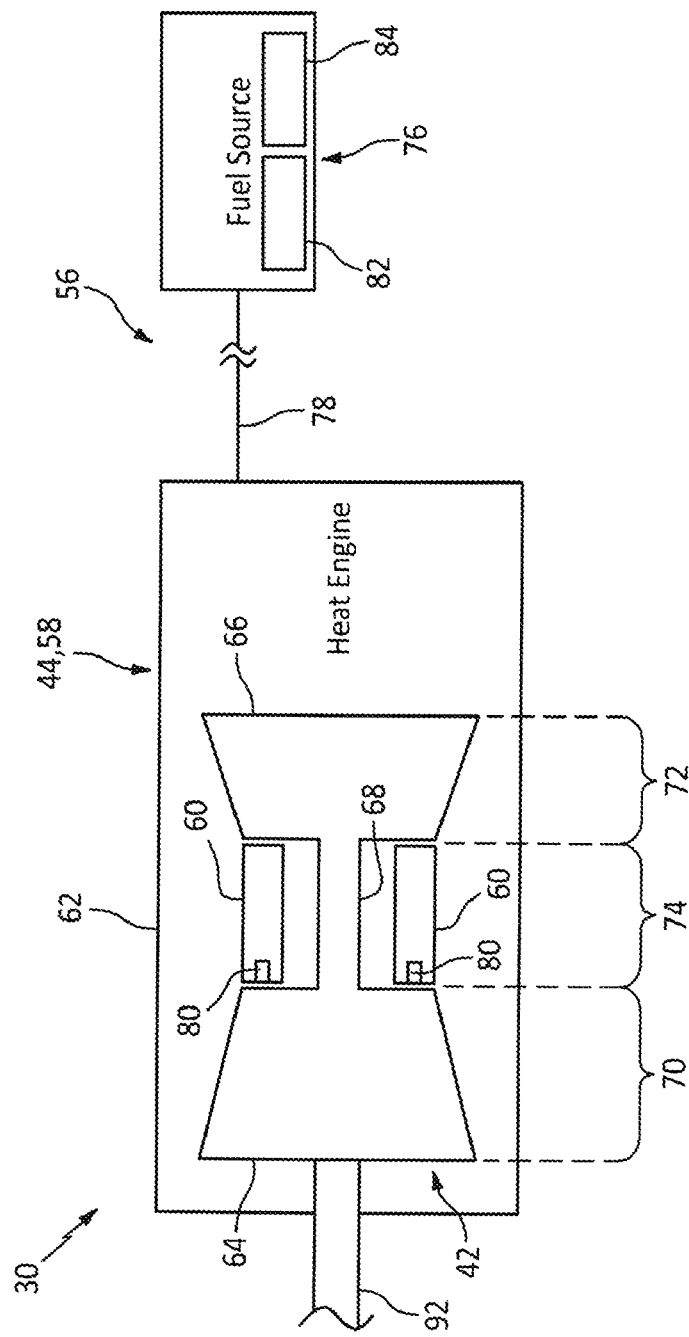
FIG. 3 is a schematic illustration of an engine system with a heat engine for the hybrid powerplant, where the heat engine may be configured as a gas turbine engine with at least a core spool.

The gas turbine engine 58 of FIG. 3 includes the rotating assembly 42, a combustor 60 and an engine case 62 housing the rotating assembly 42 and the combustor 60. The rotating assembly 42 includes a bladed compressor rotor 64, a bladed turbine rotor 66 and a shaft 68 connecting the compressor rotor 64 to the turbine rotor 66. The compressor rotor 64 is arranged in a compressor section 70 of the gas turbine engine 58. The turbine rotor 66 is arranged within a turbine section 72 of the gas turbine engine 58. The combustor 60 is arranged within a combustor section 74 of the gas turbine engine 58.

The fuel system 56 of FIG. 3 includes a fuel source 76 and at least one fuel line 78. The fuel source 76 is configured to provide the fuel to one or more fuel injectors 80 of the heat engine 44 (the gas turbine engine 58 in FIG. 3) through the fuel line 78. The fuel source 76 is also configured to store (e.g., contain a quantity of) the fuel before, during and/or after heat engine operation. The fuel source 76 of FIG. 3, for example, includes a fuel reservoir 82 and a fuel flow regulator 84. The fuel flow regulator 84 may be or otherwise include a pump and/or a valve. This fuel flow regulator 84 is configured to direct fuel received from the fuel reservoir 82 to the fuel injectors 80 through the fuel line 78.

Figure 4:
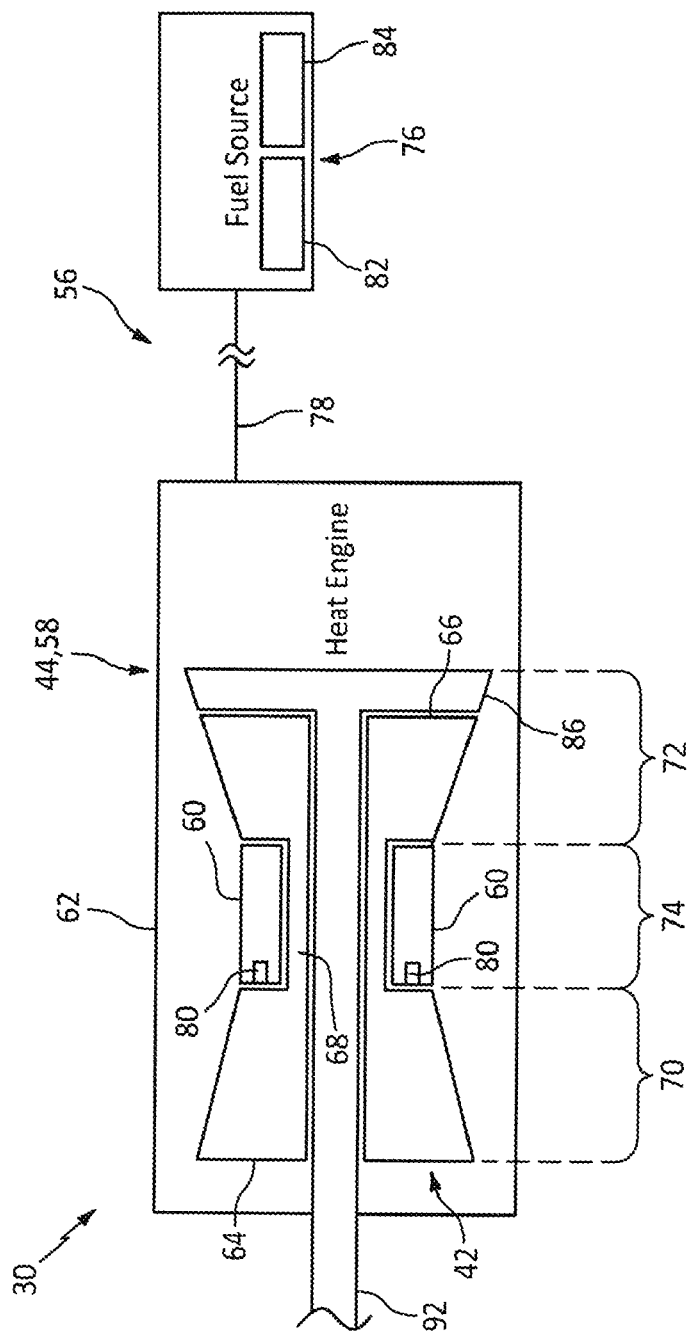
FIG. 4 is a schematic illustration of the engine system, where the heat engine may be configured as a gas turbine engine with at least the core spool and a free turbine.

During operation of the gas turbine engine 58 of FIG. 3, air enters a gas path within the gas turbine engine 58 through an airflow inlet. The gas path extends sequentially through the compressor section 70, the combustor section 74 and the turbine section 72. This air is compressed by the compressor rotor 64 and directed into a combustion chamber of the combustor 60. The fuel received from the fuel system 56 is injected into the combustion chamber and mixed with the compressed air to provide a fuel-air mixture. This fuel-air mixture is ignited and combustion products thereof flow through and cause the turbine rotor 66 to rotate. The rotation of the turbine rotor 66 drives rotation of the compressor rotor 64 and, thus, compression of the air received from the airflow inlet. The rotation of the rotating assembly 42 also provides mechanical power for driving (e.g., rotating) the rotor 34 (see FIG. 1). The present disclosure, however, is not limited to such an exemplary gas turbine engine configuration. For example, referring to FIG. 4, the gas turbine engine 58 may also include a free turbine 86 (e.g., a power turbine) that provides the mechanical power for driving the rotor 34 (see FIG. 1). The present disclosure is also not limited to gas turbine engine applications. For example, in other embodiments, the heat engine 44 of FIG. 1 may alternatively be configured as a reciprocating piston internal combustion (IC) engine or a rotary internal combustion (IC) engine.

The geartrain 32 is configured to motively couple the electric machine 36 and the heat engine 44 to the mechanical load 26. An electric machine coupler 88 (e.g., a shaft), for example, rotatably couples the electric machine 36 and its machine rotor 46 (e.g., see also FIG. 2) to a first component 90 of the geartrain 32; e.g., a gear, a carrier, a shaft, etc. A heat engine coupler 92 (e.g., a shaft) rotatably couples the heat engine 44 and its rotating assembly 42 (e.g., see also FIGS. 3 and 4) to a second component 94 of the geartrain 32; e.g., a gear, a carrier, a shaft, etc. The output shaft 35 rotatably couples the mechanical load 26 and its rotor 34 to a third component 96 of the geartrain 32; e.g., a gear, a carrier, a shaft, etc. These geartrain components 90, 94 and 96 are arranged together within a geartrain case 98 such that mechanical power may be transmitted through the geartrain 32 and its components 90, 94 and 96, for example: (1) from the electric machine 36 to the rotor 34; (2) from the heat engine 44 to the rotor 34; (3) from the heat engine 44 to the electric machine 36; and/or (4) from the electric machine 36 to the heat engine 44.

The powerplant housing 22 of FIG. 1 includes one or more containment zones 100A and 100B (generally referred to as "100"); e.g., fire zones. Each of these containment zones 100 is configured as a discrete section within the powerplant housing 22 for housing (e.g., containing) one or more components (e.g., 32, 36 and 44) of the hybrid powerplant 20. The electric machine 36 of FIG. 1, for example, is housed within the electric machine containment zone 100A. The heat engine 44 is housed within the heat engine containment zone 100B. The geartrain 32 may also be housed within the heat engine containment zone 100B. By arranging the electric machine 36 in a different containment zone from at least the heat engine 44, high voltage electricity running through the portion of the electric system 28 within the powerplant housing 22 may be (e.g., completely) separated from combustible/flammable fluids (e.g., the fuel, lubricant, hydraulic fluid, etc.) flowing through and/or about the portion of the heat engine system 30 within the powerplant housing 22. Thus, at least the combustible/flammable fluids associated with the heat engine 44 and the engine system 30 may be (e.g., completely) separated from a high voltage ignition source within the powerplant housing 22.

The powerplant housing 22 of FIG. 1 includes an electric machine containment wall 102; e.g., a firewall. This electric machine containment wall 102 forms an outer peripheral boundary of the electric machine containment zone 100A. At least one section 104A of the electric machine containment wall 102 may form a barrier between the electric machine 36 and its associated zone 100A and the heat engine 44 and its associated zone 100B. At least one section 104B of the electric machine containment wall 102 may form a barrier between the electric machine 36 and its associated zone 100A and the geartrain 32 and its associated zone 100B. While the electric machine coupler 88 of FIG. 1 extends through the containment wall section 104B, a seal between the electric machine coupler 88 and the containment wall section 104B may maintain the barrier/separation between the containment zones 100A and 100B. At least one section 104C of the electric machine containment wall 102 may form a barrier between the electric machine 36 and its associated zone 100A and an open air environment 106 outside of the hybrid powerplant 20 (or, alternatively another zone within the powerplant housing 22). At least one section 104D of the electric machine containment wall 102 may form a barrier between the electric machine 36 and its associated zone 100A and a structure 108 for mounting the hybrid powerplant 20 with, for example, a fuselage 110 of the aircraft; e.g., a pylon. While the electrical leads 52 and/or the signal line 112 of FIG. 1 extend through the containment wall section 104D, seals and/or interfaces between those components 52, 112 and the containment wall section 104D may maintain the barrier/separation between the electric machine containment zone 100A and an internal volume 114 of the mounting structure 108. With this arrangement, the electric machine containment wall 102 may form a (e.g., substantially sealed) internal volume (e.g., cavity, chamber, etc.) that is fluidly discrete (e.g., decoupled) from one or more or all surrounding volumes including an internal volume within the heat engine containment zone 100B.

The electric machine containment wall 102 and one or more or all of its sections 104A, 104B, 104C and/or 104D (generally referred to as "104") are configured to maintain an integrity of the electric machine containment zone 100A even when subject to, for example, a (e.g., momentary and/or periodic) high voltage electrical arc and/or a fire within (or outside of) the electric machine containment zone 100A. The electric machine containment wall 102 and its sections 104, for example, may be configured to structurally withstand (e.g., not be pierced or otherwise compromised by) an electrical arc of, for example, at least two-hundred and twenty volts (220V), five hundred volts (500V), one-thousand volts (1000V), fifteen-hundred volts 1500V), two-thousand volts (2000V) or more. More particularly, the electric machine containment wall 102 and its sections 104 may be configured to structurally withstand an electrical arc with a voltage equal to or slightly higher than (e.g., by a safety factor) a voltage of the electricity running through the electric system 28 during operation of the hybrid powerplant 20. The electric machine containment wall 102 and its sections 104 may also or alternatively be configured to structurally withstand (e.g., not be compromised by) a fire within or outside of the electric machine containment zone 100A for a prescribed period of time; e.g., at least or about five minutes, ten minutes, fifteen minutes, twenty minutes, etc. To meet these containment parameters, the electric machine containment wall 102 and one or more or all of its sections 104 may be constructed from a high voltage electrical arc resistant material and/or fire resistant material such as metal and/or composite material. Dimensions (e.g., a thickness, etc.) of the electric machine containment wall 102 and one or more or all of its sections 104 may also be selected (e.g., increased) to meet the foregoing containment parameters.

The powerplant housing 22 of FIG. 1 also includes a housing structure 116 which may be configured as or otherwise include a nacelle structure and/or a case structure. The electric machine containment zone 100A and its containment wall 102 are arranged within the housing structure 116. The heat engine containment zone 100B is also arranged within the housing structure 116, where one or more sections of the housing structure 116 and/or one or more sections (e.g., 104A and/or 104B) of the electric machine containment wall 102 may form a peripheral outer boundary of the heat engine containment zone 100B. In other embodiments, referring to FIG. 5, the powerplant housing 22 may include another containment wall 118 within the housing structure 116 that forms a boundary of the heat engine containment zone 100B at least between the heat engine 44 and the electric machine 36, or completely around at least the components 32 and/or 44. This heat engine containment wall 118 may be configured to maintain an integrity of the heat engine containment zone 100B even when subject to, for example, a fire within (or outside of) the heat engine containment zone 100B. The heat engine containment wall 118, for example, may be configured to structurally withstand (e.g., not be compromised by) a fire within or outside of the heat engine containment zone 100B for a prescribed period of time; e.g., at least or about five minutes, ten minutes, fifteen minutes, twenty minutes, etc.

In some embodiments, a portion of the containment wall 118 between the containment zones 100A and 100B may be omitted. For example, the containment zones 100A and 100B and, more particularly, the containment walls 102 and 118 may share one or more common wall sections; e.g., 104A and/or 104B; e.g., see FIG. 5B.

Figure 6:
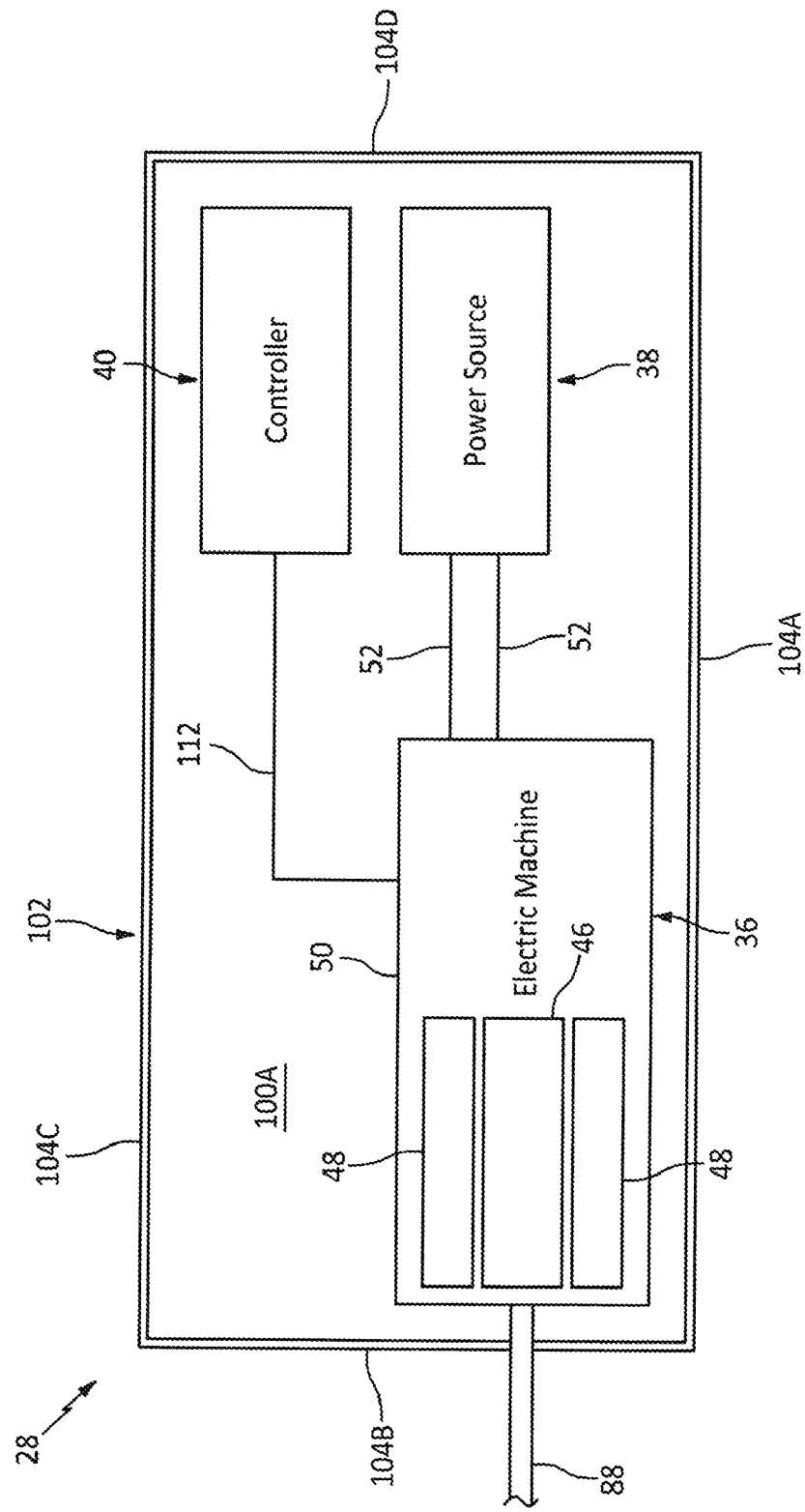
FIG. 6 is a schematic illustration of the electric system with its electric machine, power source and controller within a containment zone.

In some embodiments, referring to FIG. 6, the power source 38 and/or the controller 40 may be arranged within the electric machine containment zone 100A.

Figure 5:
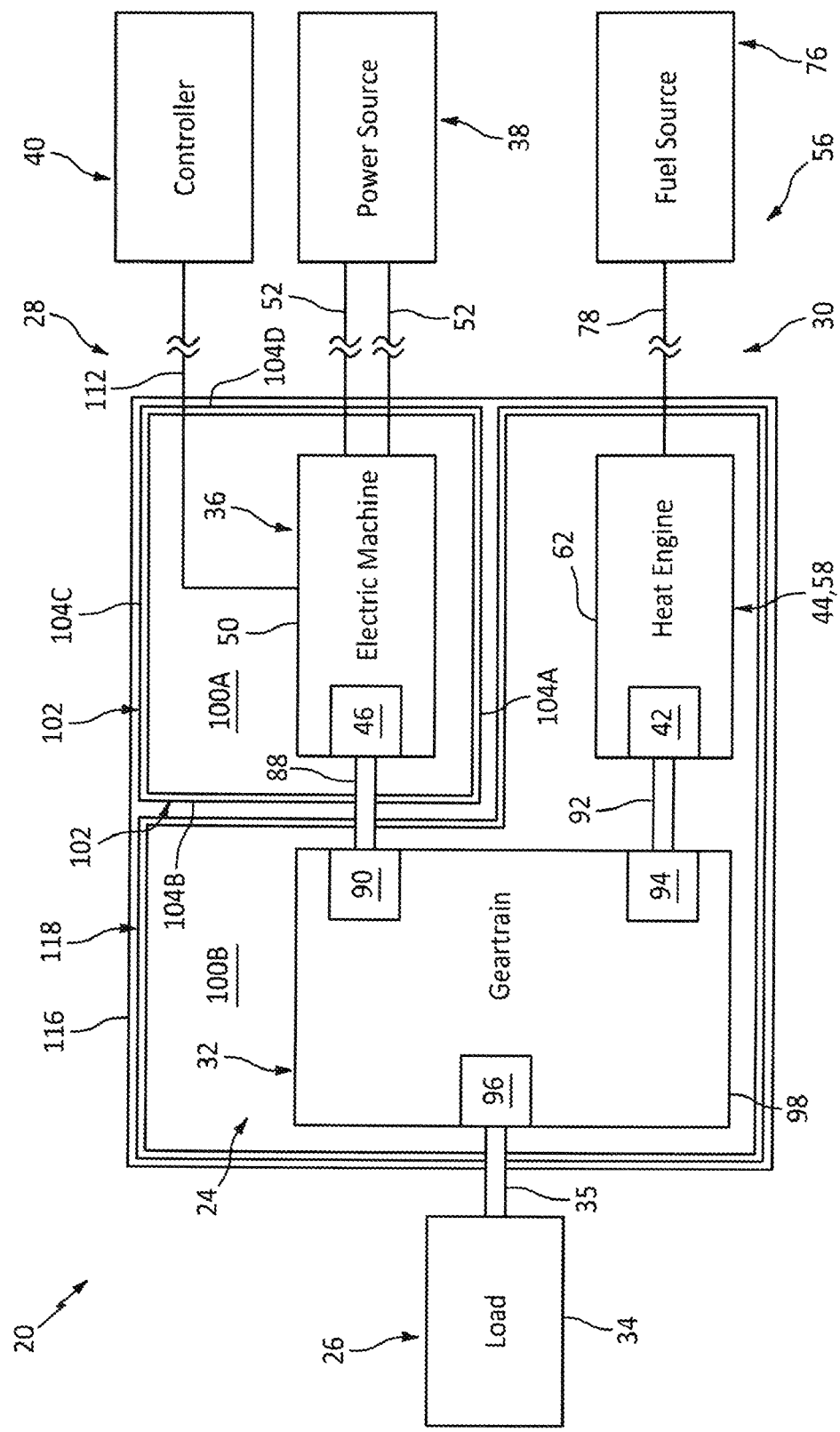
FIG. 5 is a schematic illustration of the hybrid powerplant with multiple containment walls.
Figure 5B:
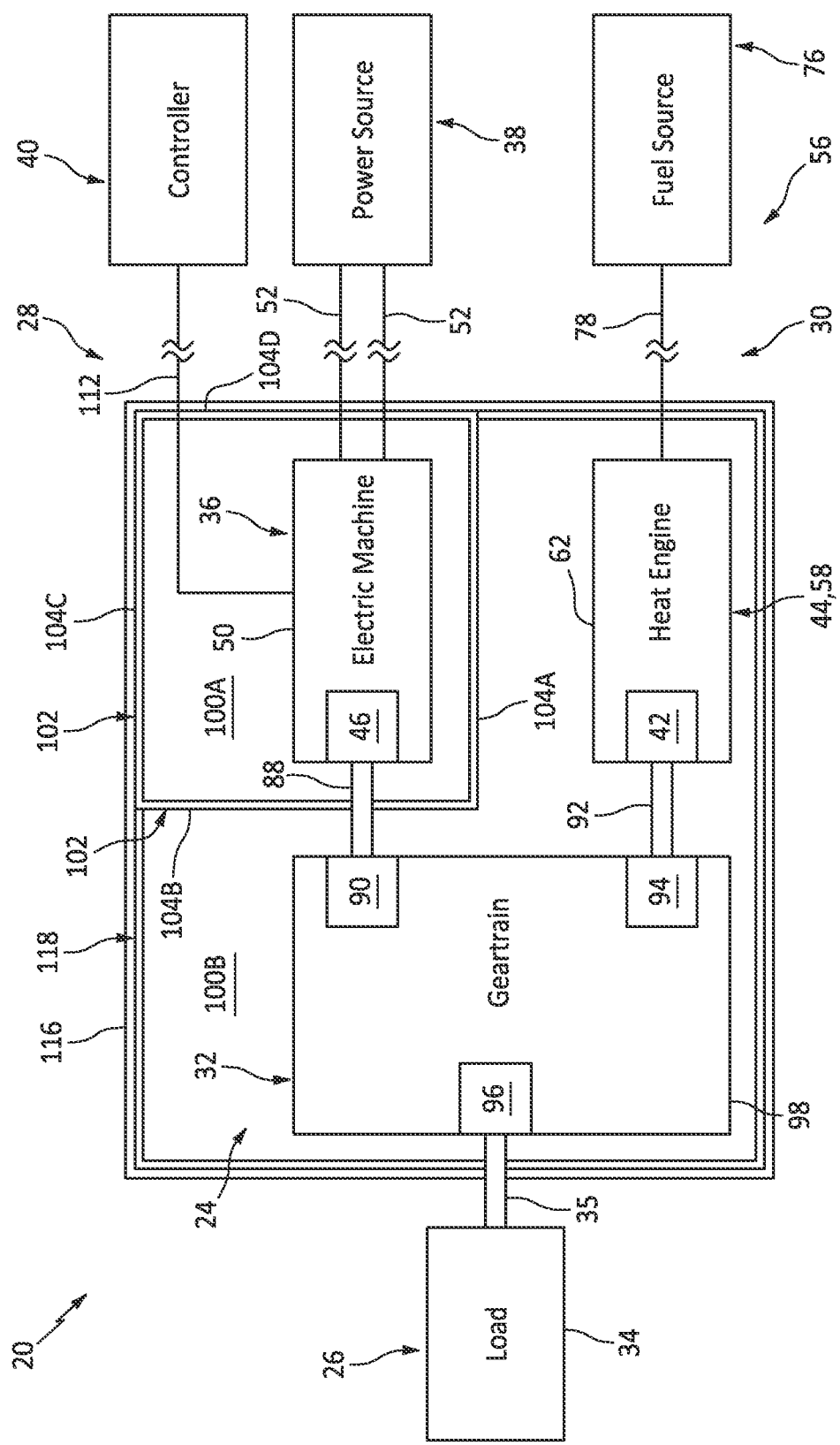
FIG. 5B is a schematic illustration of the hybrid powerplant with multiple containment walls with one or more shared sections.

In some embodiments, referring to FIGS. 1 and 5, one or more of the containment zones 100A and/or 100B may each be configured as a substantially sealed volume and/or a pressurized volume. For example, an atmosphere within the electric machine containment zone 100A may be pressurized to further reduce possibility of combustible/flammable fluid leakage from another area (e.g., the heat engine containment zone 100B) into the electric machine containment zone 100A.

Figure 7:
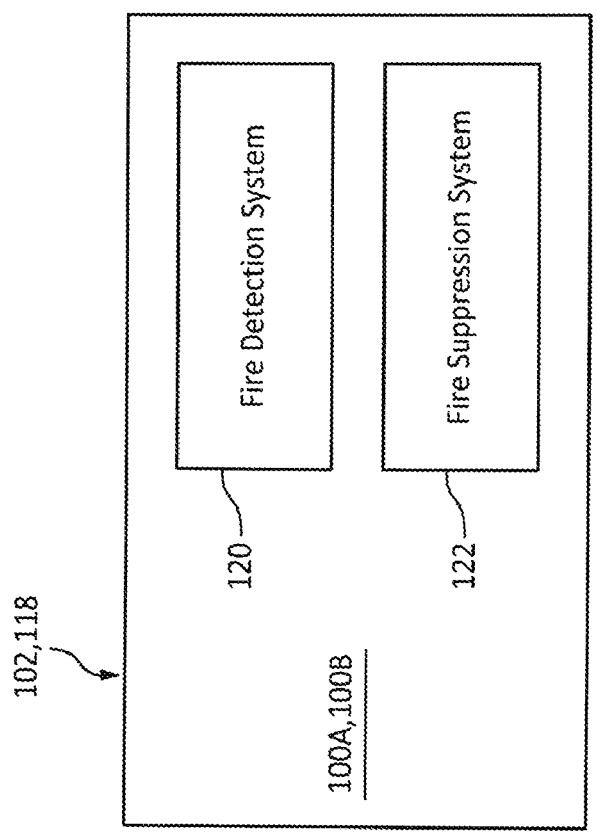
FIG. 7 is a schematic illustration of a fire detection system and a fire suppression system for a containment zone.

In some embodiments, referring to FIG. 7, one or more or all of the containment zones 100A and/or 100B may each be configured with a fire detection system 120 and/or a fire suppression system 122. The fire detection system 120 is configured to detect a fire within the respective containment zone 100A, 100B. The fire suppression system 122 is configured to suppress or extinguish the fire within the respective containment zone 100A, 100B, for example, upon detection of the fire by the fire detection system 120.

Figure 8:
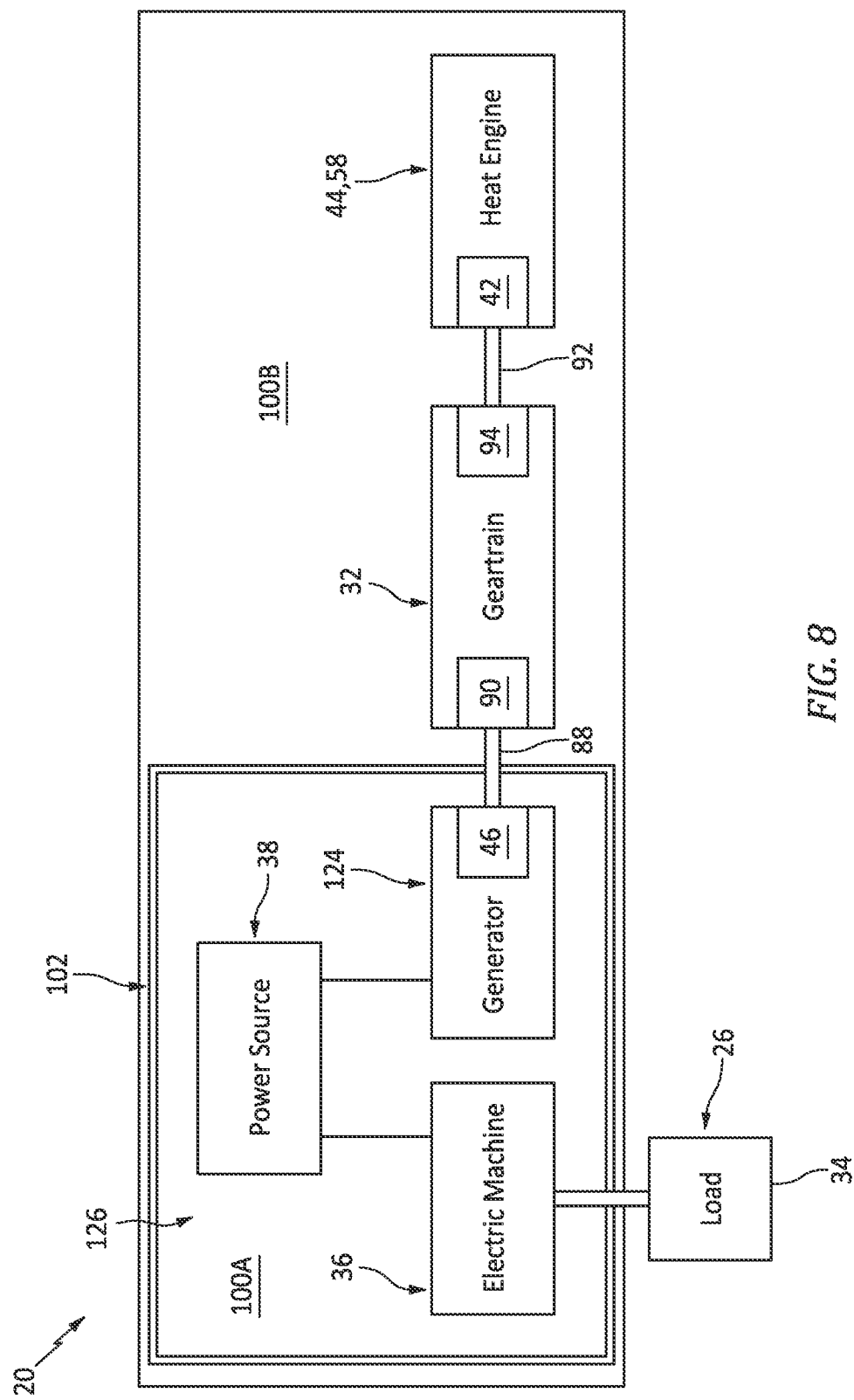
FIG. 8 is a schematic illustration of the hybrid powerplant with its electric machine, heat engine and geartrain in series.

In some embodiments, referring to FIG. 1, the geartrain 32 may be coupled with the electric machine 36 and the heat engine 44 in parallel. In other embodiments, referring to FIG. 8, the geartrain 32 may be coupled in series between the electric machine 36 and the heat engine 44. More particularly, the geartrain 32 of FIG. 8 is mechanically coupled between the heat engine 44 and a generator 124 for an electric propulsion system 126. The generator 124 may be electrically coupled to the power source 38 and/or the electric machine 36 (e.g., a motor) through an electrical distribution network; e.g., cables, switches, etc. The power source 38 may also or alternatively be electrically coupled to the electric machine 36 through the electrical distribution network. The electric machine 36 is mechanically coupled to the load 26.

The powerplant housing 22 is described above with containment zones 100 for both the electric machine 36 and the heat engine 44. However, in other embodiments, the heat engine containment zone 100B may be omitted. In still other embodiments, the electric machine containment zone 100A may be omitted.

In some embodiments, the containment wall 102 may be configured as a discrete component and/or structure from the components (e.g., the electric machine 36, etc.) disposed within the containment zone 100A. However, in other embodiments, it is contemplated the containment wall 102 may include at least (or only) one component and/or structure of one or more or all of the components (e.g., a case for the electric machine 36, etc.) disposed within the containment zone 100A.

In some embodiments, the containment wall 118 may be configured as a discrete component and/or structure from the components (e.g., the geartrain 32, the heat engine 62, etc.) disposed within the containment zone 100B. However, in other embodiments, it is contemplated the containment wall 118 may include at least (or only) one component and/or structure of one or more or all of the components (e.g., a case for the geartrain 32, a case for the heat engine 62, etc.) disposed within the containment zone 100B.

Figure 9:
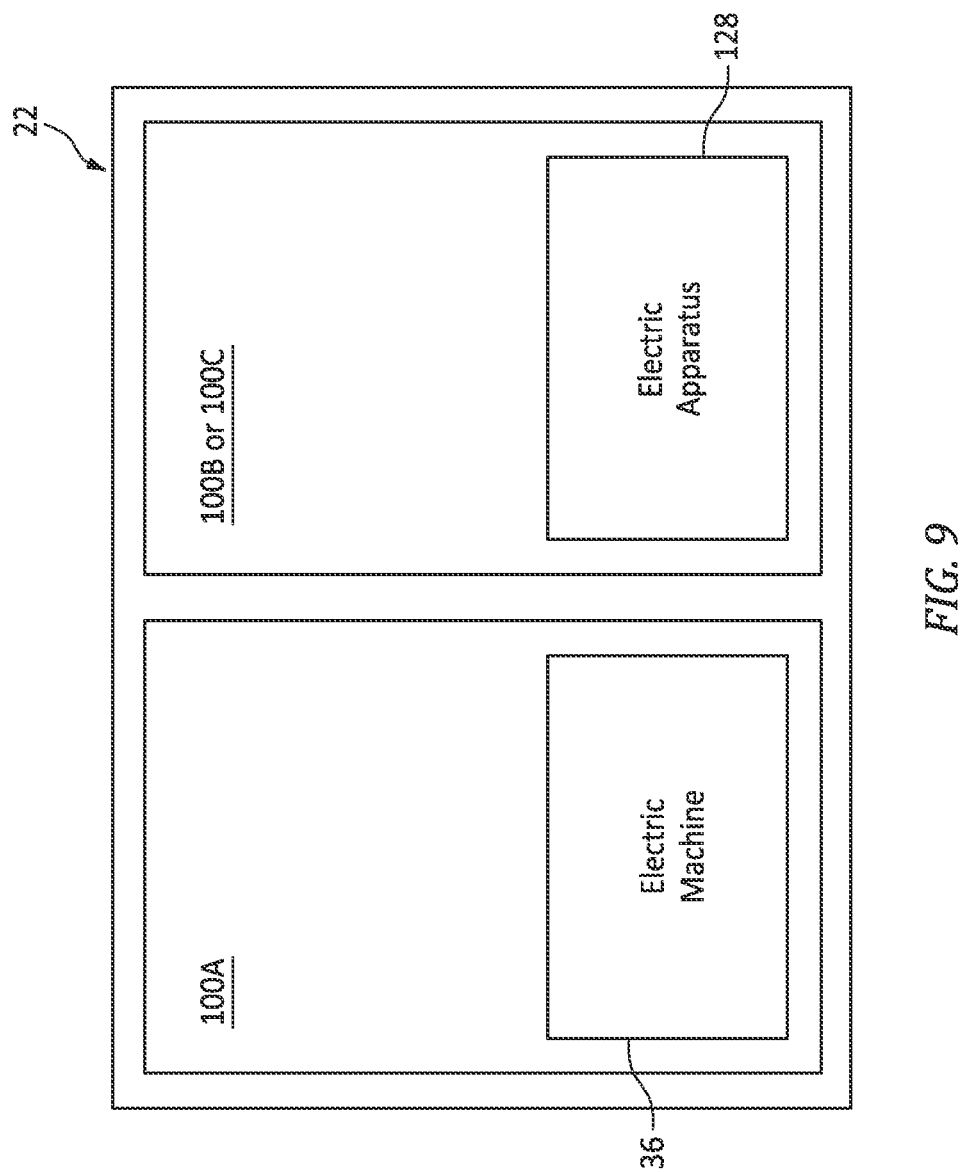
FIG. 9 is a schematic illustration of multiple electric systems in discrete containment zones.

While the containment zones 100 may separate the electric machine 36 and its components from the heat engine 44 and its components, the containment zone 100A may also or alternatively separate the electric machine 36 and its components from one or more other components of the hybrid powerplant 20 and/or one or more other components of the aircraft. For example, referring to FIG. 9, the containment zone 100A may separate the electric machine 36 and its components from another electric apparatus 128 for another hybrid powerplant or the same hybrid powerplant 20. This apparatus 128 may be arranged in the containment zone 100B, or another containment zone 100C discrete from the containment zones 100A and 100B. The apparatus 128 include one or more components such as, but not limited to, an electric machine, a power storage system, etc.

While the powerplant housing 22 may be discrete from the fuselage as generally described above, the powerplant housing 22 may alternative be configured within and/or part of the fuselage.

While certain components are described above as being coupled together via a shaft, it is to be understanding that one or more additional components may be included for coupling those components together. For example, a single shaft may be replaced by two shafts connected together; e.g., via a splined interface. In another example, a single shaft may be replaced by a shaft and a geartrain, two shafts and a geartrain, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A hybrid powerplant for an aircraft, comprising:
a housing comprising a containment zone located within the housing;
an electric machine arranged within the containment zone;
a heat engine arranged at least partially within the housing and outside of the containment zone;
a geartrain arranged at least partially within the housing and at least in partially outside of the containment zone; and
the electric machine, the heat engine and the geartrain being operatively interconnected.

2. The hybrid powerplant of claim 1, wherein
the housing further comprises a firewall at least partially forming the containment zone; and
the firewall is configured to maintain the containment zone when subjected to an electrical arc of at least two-hundred and twenty volts.

3. The hybrid powerplant of claim 1, wherein
the housing further comprises a firewall at least partially forming the containment zone;
the firewall is configured to maintain the containment zone when subjected to a fire.

4. The hybrid powerplant of claim 1, wherein
the housing further comprises a firewall at least partially forming the containment zone; and
a mechanical coupler projects through the firewall and motively couples the electric machine to the geartrain.

5. The hybrid powerplant of claim 1, wherein
the housing further comprises a firewall at least partially forming the containment zone; and
the firewall forms a barrier between the electric machine and the heat engine.

6. The hybrid powerplant of claim 1, further comprising:
an electric apparatus within the housing and discrete from the heat engine;
the housing comprising a firewall at least partially forming the containment zone, and the firewall forms a barrier between the electric machine and the electric apparatus.

7. The hybrid powerplant of claim 1, wherein
the housing further comprises a firewall at least partially forming the containment zone; and
the firewall forms a barrier between the electric machine and an open air environment outside of the housing.

8. The hybrid powerplant of claim 1, further comprising:
an electric power source;
the housing further comprises a firewall at least partially forming the containment zone; and
an electrical lead projecting through the firewall and electrically coupling the electric power source to the electric machine.

9. The hybrid powerplant of claim 1, further comprising an electric power source arranged within the containment zone and electrically coupled to the electric machine.

10. The hybrid powerplant of claim 1, further comprising an aircraft component comprising a nacelle or a fuselage;
an electric system comprising the electric machine, wherein an entirety of the electric system within the aircraft component is arranged within the containment zone; and
a fuel system for the heat engine, wherein an entirety of the fuel system within the aircraft component is arranged outside of the containment zone.

11. The hybrid powerplant of claim 1, wherein the containment zone is a pressurized zone within the housing.

12. The hybrid powerplant of claim 1, wherein
the housing further comprises a second containment zone located within the housing;
the second containment zone is fluidly decoupled from the containment zone; and
the heat engine is arranged within the second containment zone.

13. The hybrid powerplant of claim 1, wherein the geartrain is coupled to the electric machine and the heat engine in parallel.

14. The hybrid powerplant of claim 1, further comprising:
a bladed propulsor;
wherein the geartrain is coupled to the bladed propulsor through the electric machine; and
wherein the heat engine is coupled to the electric machine through the geartrain.

15. The hybrid powerplant of claim 1, further comprising a propulsor rotor coupled to and rotatably driven by the geartrain.

16. A hybrid powerplant for an aircraft, comprising:
a housing comprising a containment zone and a containment wall, the containment zone located within the housing and at least partially formed by the containment wall, and the containment wall configured to maintain the containment zone when subject to an electrical arc of at least two-hundred and twenty volts;
an electric machine arranged within the housing to a first side of the containment wall; and
a heat engine arranged within the housing to a second side of the containment zone.

17. The hybrid powerplant of claim 16, further comprising a geartrain arranged within the housing to the second side of the containment zone, and the geartrain mechanically coupled to the electric machine and the heat engine.

18. The hybrid powerplant of claim 16, further comprising:
a generator powered by the heat engine;
the generator electrically coupled to the electric machine through an electrical distribution network.

19. The hybrid powerplant of claim 12, wherein
the containment zone is formed by a first containment wall;
the second containment zone is formed by a second containment wall spaced from the first containment wall; and
the first containment wall and the second containment wall are arranged between the electric machine and the heat engine.

20. The hybrid powerplant of claim 12, wherein the geartrain is arranged completely within the second containment zone.

\* \* \* \* \*